# UNITED STATES PATENT OFFICE.

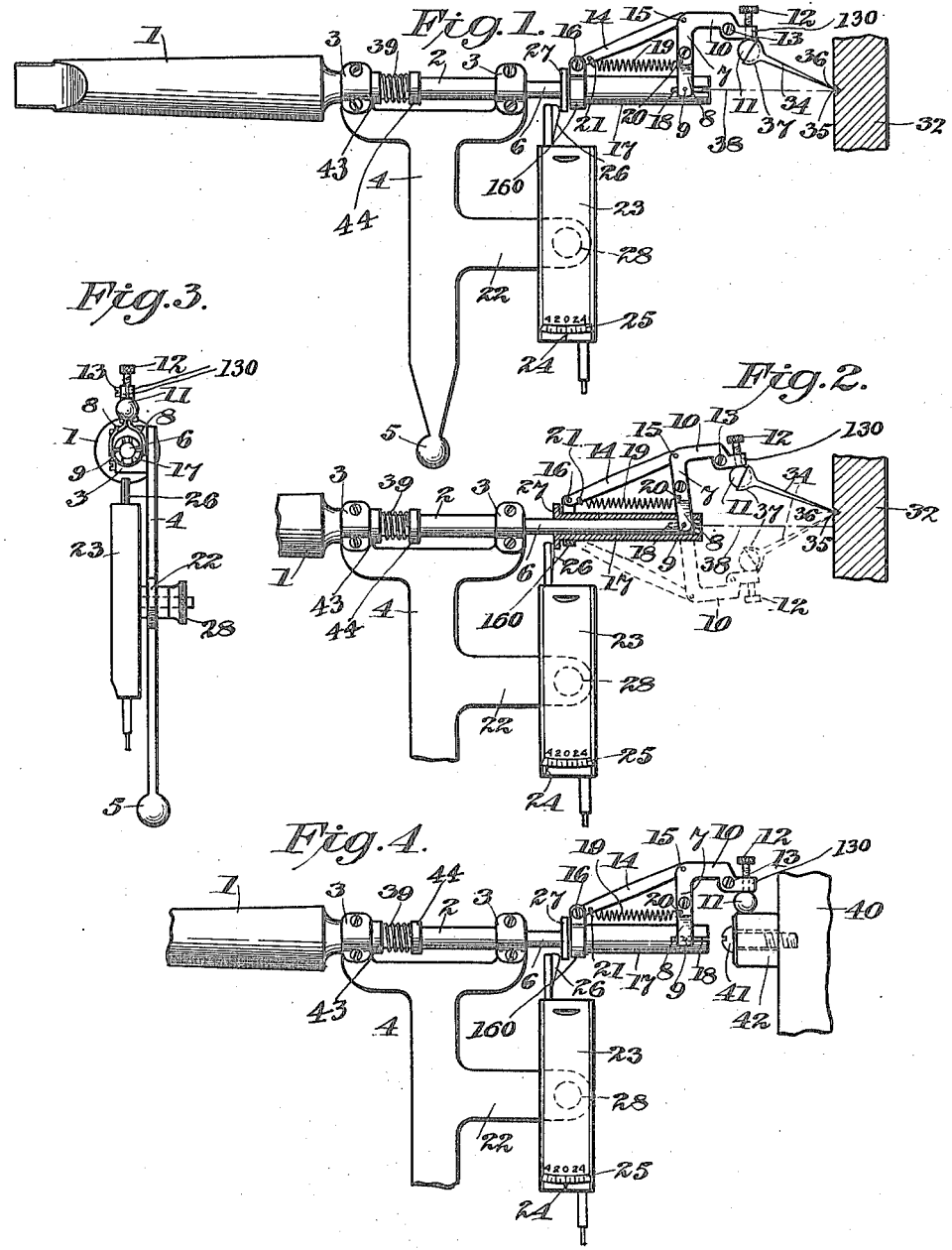

WILLIAM ELSASSER, OF IRVINGTON, NEW JERSEY.

CENTER-FINDER.

1,264,910.  Specification of Letters Patent.  Patented May 7, 1918.

Application filed June 5, 1917. Serial No. 173,030.

*To all whom it may concern:*

Be it known that I, WILLIAM ELSASSER, a citizen of the United States, residing at Irvington, in the county of Essex, State of New Jersey, have invented certain new and useful Improvements in Center-Finders, of which the following is a full, clear, and exact specification.

This invention relates to center finders for boring machines, and has for its object to provide an improved device for testing such a machine to see if the boring tool will exactly strike the center point at which the hole is to be bored in the work.

It is customary to punch a small conical cavity in the face of the work at the center point where a hole is to be bored. The present invention is used to determine whether the boring tool will exactly strike said cavity after the work is set up in the machine. The device may also be used for truing up various kinds of work, such as the button illustrated in Figure 4 of the drawings.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Fig. 1 is a side elevation of a center finder or testing device made substantially in accordance with this invention, the same being shown in position for testing a center punch cavity which is directly in line with the tool.

Fig. 2 is a similar view of the device in position for testing a center punch cavity which is not co-axial with the tool, parts of the shank and support of the device being broken away.

Fig. 3 is an end elevation of the testing device.

Fig. 4 is a broken side elevation of the testing device in position for testing a button.

Figure 5:
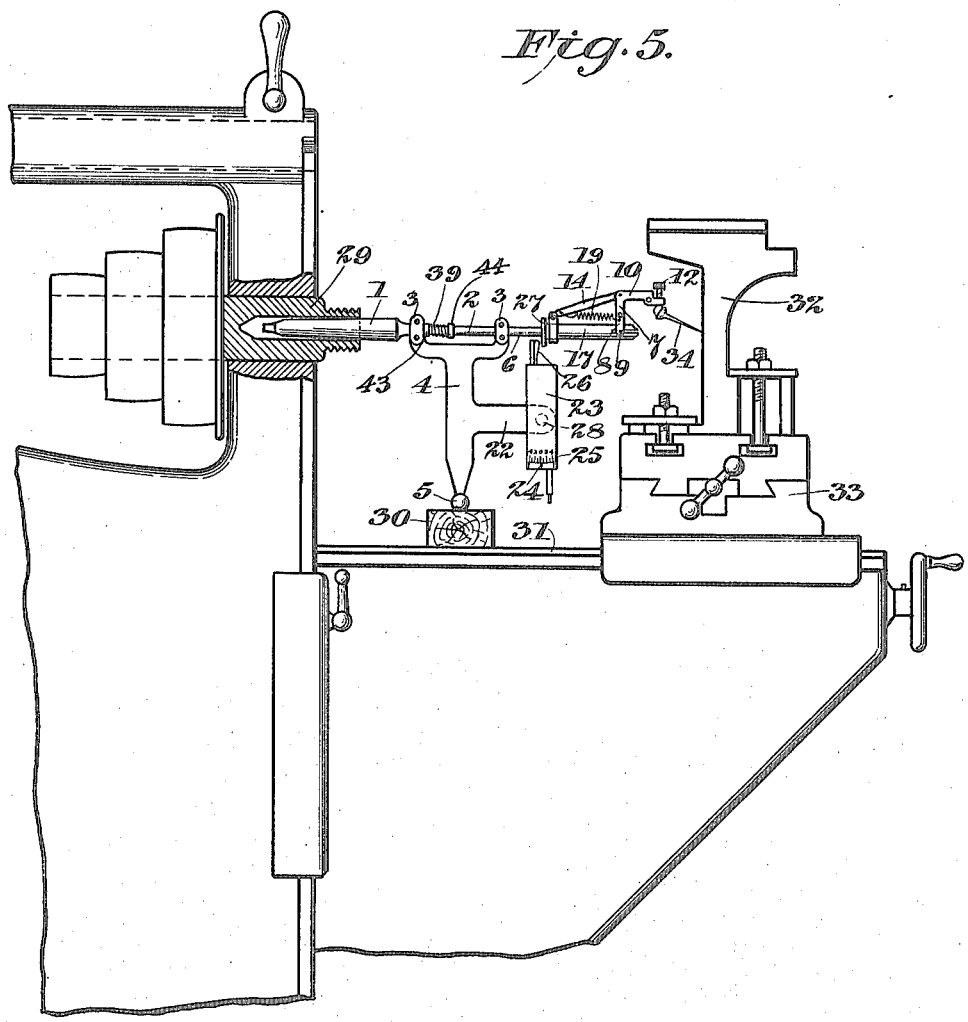
Fig. 5 is a broken view of a boring machine, showing the testing device applied thereto and in operative relation to the work.

The device comprises a shank 1 corresponding to the shank of a boring tool and adapted to be inserted in the headstock of a boring machine in place of the shank of the boring tool when the device is used for testing purposes before the boring is done. From the shank 1 there extends co-axially therewith a reduced cylindrical portion 2 on which are loosely mounted the spaced collars 3 of the supporting bracket 4 which is preferably provided with a ball 5 on its lower end, as illustrated in Figs. 1, 3 and 5. Beyond the collars 3, the shank is further reduced, as at 6, said portion 6 being also co-axial with the parts 1 and 2.

Around the reduced end portion 6 of the shank is loosely fitted a sleeve 17 having axially extending slots 18 in its end through which slots extends a pivot pin 9 connecting the extremity of the part 6 with the arms of a yoke 8 at the lower end of a feeler arm comprising an outwardly extending portion 7 and an angularly bent portion 10 equipped with a feeler ball 11 carried by an adjusting screw 12 operatively engaging between clamping jaws 130 at the end of the bent portion 10 of the arm. The clamping jaws 130 may be locked about the adjusting screw 12 for retaining it in adjusted position by means of a screw 13. The outer end portion of the portion 7 of the feeler arm is pivotally connected at 15 to one end of a bar 14 which is pivotally connected at 16 at its other end to a collar 160 fast on the sleeve 17, whereby any swinging movement of said feeler arm on its pivot 9 at the end of the shank will impart a sliding movement to the sleeve 17 on said shank. A spring 19 attached at one end to the feeler arm at 20, and at the other end to the bar 14 at 21 normally and yieldingly holds the sleeve at its farthest advanced position.

The supporting bracket 4 has an offset portion 22 to which an indicator 23 is pivotally connected and to which it may be clamped in adjusted position by means of a clamping nut 28, best shown in Fig. 3. The indicator 23 may be of any desired known construction, the one illustrated being known as the Koch indicator, patented July 17, 1906, No. 825,911, and having a segmental dial 25 along which a pointer 24 is movable when a protruding arm 26 is pressed. The indicator 23 is clamped in position to hold the arm 26 in contact with a flange 27 on the inner end of the sleeve 17, as illustrated in Fig. 1, when the device is to be used.

Referring for a moment to Fig. 5, 29 indicates the headstock of a boring machine, 31 the bed, and 33 the carriage thereof. The work 32 is shown suitably clamped on the carriage, and the center finder or testing device constituting the present invention is illustrated in operative position with the shank 1 fitted in the socket of the headstock, and the supporting bracket 4 resting on a block 30 on the bed of the machine.

In testing the center punch cavity for a hole to determine whether it is arranged co-axial with the boring tool (not shown) to be placed in the socket of the headstock 29 when the hole is to be bored in the work, a pointed instrument 34 is used, as indicated in Figs. 1 and 2 as well as Fig. 5. This pointed instrument 34 has a substantially semi-spherical socket 37 at one end adapted to fit around the ball 11 of the feeler arm 7—10.

When a test of a center punch cavity 35 in the work 32 is to be made, the pointed end 36 of the instrument 34 is placed in said cavity 35, and the socket 37 fitted around the feeler ball 11, the work being adjusted on the machine near enough to the testing device to hold said instrument in position, and where the cavity appears to be co-axial with the shank of the testing device. A spring 39 coiled about the portion 2 of the shank between a fast collar 44 thereon and a loose collar 43 bearing against one of the collars 3 on the supporting bracket, serves to retain the collars 3 of said bracket against sliding freely back and forth on the shank 2. The spring 19 yieldingly holds the feeler ball 11 in the socket 37 of the instrument 34, and the pointed end of said instrument in the cavity 35 in the work. If the cavity 35 is actually in line with the axis of the shank of the testing device, the latter may be rotated in the machine without causing any swinging of the feeler arm on its pivot 9 or sliding of the sleeve 17 on the shank portion 6. This is the condition illustrated in Fig. 1 where the broken line 38 indicates the median line of the shank of the tool and is shown passing through the center of the cavity 35 in the work. The fact that said cavity is in line with the axis of the shank of the testing device is proved by the pointer of the indicator 23 remaining stationary during the revolution of said device.

If the cavity 35 is not co-axial with the shank of the testing device, as illustrated in Fig. 2, the rotation of said shank in the machine will cause the feeler arm to swing on its pivot 9, and the sleeve 17 to slide on the shank portion 6 through the medium of the connecting bar 14, and the flange 27 on said sleeve will press against the arm 26 of the indicator 23 and move the pointer 24 along the scale 25 so as to indicate the extent or degree the cavity 35 is out of line with the axis of the shank of the testing device. The broken line 38 indicating the axis or median line of the shank of the device is used also in Fig. 2 to show in a somewhat exaggerated manner how the cavity 35 may be out of co-axial relation to the testing device. If this condition is found to exist, the work must be readjusted, and one or more further tests made until the cavity 35 is proved to be in proper position so that when the boring tool (not shown) is substituted for the testing device in the machine, said boring tool will exactly strike the center of the cavity 35, thus insuring the boring of the hole in true position.

As illustrated in Fig. 4, the device may be used for testing the button 42, which is attached to the work 40 by the screw bolt 41 passed loosely therethrough, by placing the feeler ball 11 in contact with the cylindrical outer face of said button, and rotating the tester shank in the boring machine, as already explained. If the button is in true co-axial relation to the headstock of the machine, there will be no swinging of the feeler arm on its pivot 9, or sliding of the sleeve 17 on the portion 6 of the shank of the device, but if said button is not in true co-axial position, then the feeler arm will swing and the sleeve slide on the shank, the degree that said button is out of true being indicated by the pointer 24 on the scale 25 of the indicator 23.

Having thus described my invention, what I claim as new and desire to secure by Letters Patent of the United States is:—

1. In a testing device of the character described, the combination with a shank adapted to turn with the headstock of a boring machine, of a feeler arm pivoted on said shank, a sleeve mounted to slide on said shank, means of connection between said arm and sleeve, whereby the swinging of the arm will slide the sleeve on the shank, a supporting bracket for the shank in which the latter is adapted to rotate, an indicator mounted on said bracket to be operated by the sliding of the sleeve on the shank, and means for holding said indicator at different angles of adjustment on said bracket.

2. In a testing device of the character described, the combination with a shank adapted to turn with the headstock of a boring machine, of a feeler arm pivoted to the shank and having an outwardly extending portion and an angularly bent portion extending substantially parallel to the shank, a screw adjustable transversely of said bent portion of the arm, a ball on the end of said screw, a sleeve mounted to slide on said shank, means of connection between said arm and sleeve, whereby the swinging of said arm will cause the sleeve to slide on the shank, and an indicator to be operated by the sliding of the sleeve on the shank.

3. In a testing device of the character described, the combination with a shank adapted to turn with the headstock of a boring machine, of a sleeve mounted to slide on said shank and having diametrically arranged axial slots in its outer end, a feeler arm having a yoke embracing said sleeve, a pivot pin passed through the yoke and shank and arranged in said slots, means for connecting said arm and sleeve, whereby swinging of the arm will cause the sleeve to slide on the shank, and an indicator to be operated by the sliding of the sleeve on the shank.

4. The combination, with a shank adapted to turn with the headstock of a boring machine, of a feeler arm pivoted on said shank, a sleeve mounted to slide on the shank, means of connection between the arm and sleeve, whereby swinging of the arm will cause the sleeve to slide on the shank, an indicator to be operated by the sliding of the sleeve on the shank, and a pointed instrument having a socket adapted to be engaged with the end of the feeler arm when its pointed end is engaged with a cavity in a piece of work, for the purpose specified.

5. In a testing device of the character described, the combination with a shank adapted to turn with the headstock of a boring machine, of a feeler arm pivoted on said shank, a sleeve mounted to slide on the shank, means of connection between said arm and sleeve, whereby swinging of the arm will cause the sleeve to slide on the shank, an indicator to be operated by the sliding of the sleeve on the shank, a ball on the end of the feeler arm, and a pointed instrument having a semi-spherical socket in one end adapted to fit around said ball when the pointed end is engaged with a center cavity in a piece of work, for the purpose specified.

6. In a testing device of the character described, the combination with a shank adapted to turn with the headstock of a boring machine, of a feeler arm pivoted on the shank, a sleeve mounted to slide on the shank, means of connection between said arm and sleeve, whereby swinging of the arm will cause the sleeve to slide on the shank, an indicator to be operated by said sleeve, a pointed instrument having a socket to engage the end of the feeler arm when its pointed end is engaged with a center cavity in a piece of work, for the purpose specified, a supporting bracket for the shank having a collar loosely fitted therearound, a collar fast on the shank, and a spring interposed between said fast collar and the collar on the bracket for the purpose specified.

In testimony whereof I have signed my name to this specification.

WILLIAM ELSASSER.